(12) United States Patent
Yoda et al.

(10) Patent No.: US 9,063,220 B2
(45) Date of Patent: Jun. 23, 2015

(54) OBJECT INFORMATION ACQUIRING APPARATUS

(71) Applicant: CANON KABUSHIKI KAISHA, Tokyo (JP)

(72) Inventors: Haruo Yoda, Nishitama-gun (JP); Kenichi Nagae, Yokohama (JP); Katsuya Oikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/351,238

(22) PCT Filed: Nov. 27, 2012

(86) PCT No.: PCT/JP2012/007586
§ 371 (c)(1),
(2) Date: Apr. 11, 2014

(87) PCT Pub. No.: WO2013/088654
PCT Pub. Date: Jun. 20, 2013

(65) Prior Publication Data
US 2014/0269190 A1     Sep. 18, 2014

(30) Foreign Application Priority Data

Dec. 15, 2011  (JP) ................. 2011-274224

(51) Int. Cl.
*G01S 7/00*     (2006.01)
*G01S 7/52*     (2006.01)
*G01S 15/02*    (2006.01)

(52) U.S. Cl.
CPC ............. *G01S 7/52* (2013.01); *G01S 7/52034* (2013.01); *G01S 7/52047* (2013.01); *G01S 15/02* (2013.01)

(58) Field of Classification Search
CPC ... G01S 7/52034; G01S 7/52; G01S 7/52047; G01S 15/02
USPC .......................................... 367/138; 600/437
See application file for complete search history.

(56) References Cited

U.S. PATENT DOCUMENTS

2002/0050948 A1* 5/2002 Tanaka et al. .................. 342/378
2004/0125867 A1* 7/2004 Tong et al. ..................... 375/148

(Continued)

FOREIGN PATENT DOCUMENTS

JP      2011/005237 A1    1/2011
WO     WO 2010/137453 A   12/2010
WO     WO 2010/137463     12/2010

OTHER PUBLICATIONS

C.-I.C. Nilsen et al., "Beamspace Adaptive Beamforming for Ultrasound Imaging", *IEEE Transactions on Ultrasonics, Ferroelectrics and Frequency Control*, vol. 56, No. 10, pp. 2187-2197 (Oct. 2009).

*Primary Examiner* — Luke Ratcliffe
*Assistant Examiner* — Hovhannes Baghdasaryan
(74) *Attorney, Agent, or Firm* — Fitzpatrick, Cella, Harper & Scinto (57) ABSTRACT

An object information acquiring apparatus including: a plurality of receiving elements receiving an acoustic wave propagating from an object and converting the acoustic wave into an electrical signal; a delaying unit aligning phases of electrical signals of M (a positive integer) channels outputted from the plurality of receiving elements; an eliminator reducing the electrical signals of the M channels to electrical signals of L channels (L<M); a calculator calculating Nb output signals corresponding to low-frequency components of a complex signal based on the electrical signals outputted from the eliminator; and a signal processor performing beam formation according to adaptive signal processing using output signals outputted from the calculator, where positive integers M, L, and Nb satisfy M>L>=2(Nb-1).

13 Claims, 9 Drawing Sheets

(56) References Cited

U.S. PATENT DOCUMENTS

| | | | |
|---|---|---|---|
| 2007/0005350 A1* | 1/2007 | Amada | 704/211 |
| 2008/0199025 A1* | 8/2008 | Amada | 381/92 |
| 2008/0310646 A1* | 12/2008 | Amada | 381/73.1 |
| 2009/0048824 A1* | 2/2009 | Amada | 704/10 |
| 2011/0142252 A1* | 6/2011 | Morito et al. | 381/92 |
| 2011/0208035 A1 | 8/2011 | Baba et al. | 600/407 |
| 2011/0307181 A1* | 12/2011 | Nagae | 702/19 |
| 2012/0022373 A1 | 1/2012 | Tateyama | 600/437 |
| 2012/0259198 A1 | 10/2012 | Nagae et al. | 600/407 |
| 2012/0281902 A1 | 11/2012 | Oikawa et al. | 382/131 |
| 2012/0314534 A1 | 12/2012 | Yoda et al. | 367/7 |
| 2013/0308850 A1 | 11/2013 | Oikawa et al. | 382/131 |
| 2014/0043941 A1 | 2/2014 | Yoda | 367/87 |
| 2014/0056105 A1 | 2/2014 | Nagae et al. | 367/87 |
| 2014/0206960 A1 | 7/2014 | Nagae | 600/310 |

* cited by examiner

OBJECT INFORMATION ACQUIRING APPARATUS

TECHNICAL FIELD

The present invention relates to an object information acquiring apparatus.

BACKGROUND ART

Ultrasound imaging apparatuses which perform imaging of a three-dimensional structure inside an object using ultrasound waves are widely utilized in the field of medicine as inexpensive ultrasound diagnostic apparatuses with few side effects.

Due to improvements in ultrasound imaging technology, performances of ultrasound diagnostic apparatuses are improving quickly each year. As a technique for further improving such performances, an image reconstruction technique using a DCMP (Directionally Constrained Minimization of Power) method is being studied. The DCMP method described herein is also known as the CAPON method.

The DCMP method is an adaptive signal processing technique developed as an adaptive antenna technique. The DCMP method involves adaptively adjusting directionality of reception under a constraint of maintaining a constant reception gain of radio waves that arrive from a desired direction to minimize power of all reception signals including constant interfering waves. According to this method, since the ratio of interfering wave power to signal power can be minimized, a signal with favorable SN can be received.

For example, a specific calculation according to the DCMP method can be approximately executed by following the steps below:

(1) Perform delaying on ultrasound reception signals received by a plurality (n number) of receiving elements to match phases so that n number of ultrasound reception signals originating from a same target position are aligned at the same time instant.

(2) Convert n number of reception signals with matched phases into complex signals. For the sake of the following description, n number of complex signals at a time instant t will be denoted as a received complex vector X[t] having n components.

(3) Based on the received complex vector X[t], calculate a complex correlation matrix A[k] at a constant time period T clock. k denotes the number of time intervals each having a period T, and the formula for calculating this matrix is represented by Expression (1) below:

[Math. 1]

$$A[k] = \sum_{t=kT}^{kT+T-1} X[t]X[t]^H \quad (1)$$

where the superscript H of X[t] denotes a transpose complex conjugate of a vector.

(4) Calculate an optimal weight vector W[k] using the matrix A[k] and a known constraint vector C. The formula for calculating formula the optimal weight vector is represented by Expression (2):

[Math. 2]

$$W[k] = \frac{A[k]^{-1}C}{C^H A[k]^{-1} C} \quad (2)$$

where the superscript −1 of A[k] denotes an inverse matrix of A[k]. In addition, the constraint vector C is a known vector which specifies an arrival direction of a signal and which normally sets all components of a delayed output signal to 1.

(5) Calculate a constrained minimum power Pow[k] using Expression (3) based on the optimal weight vector W[k] and the received complex vector X[t]:

[Math. 3]

$$Pow[k] = \frac{1}{2} \cdot \sum_{t=kT}^{kT+T-1} |X[t]^H W[k]|^2 \quad (3)$$

(6) Calculate a logarithm of the power Pow[k] and adopt the logarithm as a gray value q of a kth pixel of an output line image. The formula for calculating this logarithm is represented by Expression (4):

$$q = \text{Log}[Pow[k]] \quad (4)$$

Although not an essential process, this logarithmic conversion is normally performed in order to facilitate visualization of the output image.

Moreover, while a spatial averaging process on the matrix A and a process of adding a small positive number to on-diagonal elements are performed in combination with the steps described above in an actual calculation, these processes will be omitted herein for the sake of brevity. In addition, the calculation formulas described above may sometimes be modified in various ways in order to improve performance of the DCMP method. Therefore, the calculation formulas described above merely represent an example of the DCMP method and are not intended to limit the scope of the present invention.

Performing the calculations described above enables image reconstruction based on the DCMP method and produces an image with improved resolution and contrast in comparison to a reconstructed image according to a normal delay-and-sum method. However, achieving practical use of the DCMP method requires a small and inexpensive signal processing apparatus that is capable of processing in real time a tremendous amount of complicated calculations represented by Expressions (1) to (3). In reality, the difficulty of realizing such an apparatus has prevented the DCMP method from being put to practical use.

A DCMP method using a beamspace method is being studied as an important method for reducing the tremendous amount of calculations. NPL 1 (see below) proposes a beamspace method using DFT (Discrete Fourier Transform). A beamspace method using DFT involves performing a Fourier transform by multiplying a delayed input signal vector X[t] by a Butler matrix B and using a Fourier coefficient corresponding to a low-frequency portion of the product as an input X[t] of the DCMP method.

NPL 1 describes that an approximately equivalent performance can be produced even when an original input signal has a large number of channels such as 128 channels by using three Fourier transform coefficients at the most. Among the calculation steps described above, the calculation amount of Expression (2) (that is, the amount of calculation involved in performing Expression (2)) is approximately proportional to the cube of the number of input channels and hence is particularly enormous. However, if the input of 128 channels can be reduced to three channels, a dramatic reduction in the calculation amount to 1/77672 can be achieved. Therefore, a DCMP method using the beamspace method is considered to be an important approach toward putting the DCMP method into practical use.

In addition, as another means to speed up adaptive signal processing, PTL 1 (see below) discloses a configuration in which a data thinning unit that reduces the amount of data is provided in a stage preceding an adaptive signal processor in order to reduce the amount of calculation of adaptive signal processing by reducing the amount of inputted data.

CITATION LIST

Patent Literature

[PTL 1]
Japanese Patent Application Laid-open No. 2011-005237

Non-Patent Literature

[NPL 1]
*IEEE Trans. Ultrason. Ferroelectr. Freq. Control*, vol. 56, no. 10, pp. 2187-2197 (October 2009)

SUMMARY OF INVENTION

Technical Problem

The beamspace method using DFT is capable of significantly reducing the tremendous amount of calculation required by steps (3) and thereafter of the DCMP method as described above and is an extremely important method towards putting the DCMP method into practical use. However, although this method significantly reduces the amount of calculation required by steps (3) and thereafter, a problem arises in that a step (2') described below is newly required between steps (2) and (3).

(2') Perform Fourier transform on the received complex vector X[t] having n number of components to obtain nb number of coefficients, and use a new complex vector having the nb number of coefficients as components as a new X[t].

The Fourier transform of a complex vector requires a large number of multiplications among complex numbers and necessitates a large-scale calculation circuit. In addition, in an actual DCMP method, a spatial averaging process must be performed in combination in order to minimize the effect of correlative interference waves. A spatial averaging process involves repetitively executing steps (2') and (3) on partial vectors of the received complex vector X[t] and averaging the obtained complex correlation matrices. For example, a spatial averaging process of n/2 number of elements requires performing n/2 number of Fourier transforms. Therefore, the amount of calculations in an actual Fourier transform process in a practical apparatus dramatically increases in proportion to a square of the number of input channels. As a result, even though a circuit size for DCMP processing in subsequent stages is reduced, the amount of reduction of an overall circuit size is insufficient.

Although PTL 1 discloses a configuration in which a data thinning unit that reduces the amount of data is provided in a stage preceding an adaptive signal processor, there is no mention whatsoever of a beamspace method using spatial Fourier transform or the like. In addition, there is no mention whatsoever of means for thinning channel signals within an extent that low-frequency coefficients of spatial Fourier transform or the like are not affected.

The present invention has been made in considerations of the issues described above and an object thereof is to downsize the scale of an object information acquiring apparatus that performs imaging by applying a DCMP method to acoustic waves propagating from an object.

Solution to Problem

The present invention provides an object information acquiring apparatus comprising: a plurality of receiving elements configured to receive an acoustic wave propagating from an object and convert the acoustic wave into an electrical signal;
a delaying unit configured to align phases of electrical signals of M number of channels outputted from the plurality of receiving elements;
an eliminator configured to reduce the electrical signals of M number of channels to electrical signals of L number of channels;
a calculator configured to calculate Nb number of output signals corresponding to low-frequency components of a complex signal based on the electrical signals outputted from the eliminator; and
a signal processor configured to perform beam formation according to adaptive signal processing using output signals outputted from the calculator, wherein
M, L, and Nb which are positive integers satisfy the relation $M > L \geq 2(Nb-1)$.

Advantageous Effects of Invention

According to the present invention, the scale of an object information acquiring apparatus that performs imaging by applying a DCMP method to acoustic waves propagating from an object can be reduced.

Further features of the present invention will become apparent from the following description of exemplary embodiments with reference to the attached drawings.

DESCRIPTION OF EMBODIMENTS

Hereinafter, preferred embodiments of the present invention will be described with reference to the drawings. However, sizes, materials, shapes, relative arrangements, and the like of the components described below are to be modified as appropriate according to configurations of apparatuses to which the present invention is to be applied and depending on various conditions, and are not intended to limit the scope of the present invention to the description provided below.

An object information acquiring apparatus according to the present invention includes an ultrasound imaging apparatus that utilizes an ultrasound wave echo technique for acquiring object information as image data by transmitting an ultrasound wave to an object and receiving a reflected wave (echo wave) reflected and propagated inside the object. In addition, the object information acquiring apparatus also includes a photoacoustic imaging apparatus that utilizes a photoacoustic effect for acquiring object information as image data by irradiating an object with light (an electromagnetic wave) and receiving an acoustic wave generated and propagated inside the object.

In a case of utilizing the former ultrasound wave echo technique, acquired object information is information reflecting a difference in acoustic impedance among tissues inside the object. In a case of utilizing the latter photoacoustic effect, acquired object information represents a source distribution of acoustic waves generated by light irradiation, an initial acoustic pressure distribution inside the subject, an optical energy absorption density distribution or an optical energy absorption coefficient distribution derived from an initial acoustic pressure distribution, or a concentration distribution of a substance constituting tissue. Examples of a concentration distribution of a substance include oxygen saturation distribution and oxidized/reduced hemoglobin concentration distribution.

An acoustic wave as used in the present invention is typically an ultrasound wave and includes an elastic wave that is also referred to as a sound wave, an ultrasound wave, and an acoustic wave. An acoustic wave generated by a photoacoustic effect is referred to as a photoacoustic wave. An acoustic detector (for example, a probe) receives an acoustic wave generated or reflected inside an object and propagated from the object.

A solution according to the present invention to the problems described above will now be outlined. Focusing on the fact that a beamspace method exclusively uses low-frequency coefficients of a Fourier transform, the present invention provides a unit for thinning the number of input channels within an extent that the low-frequency coefficients are not affected.

Conventionally, a method of reducing the number of inputs is known as a means of reducing the amount of calculation required by beam forming PTL 1 discloses a configuration in which a data thinning unit that reduces the amount of data is provided in a stage preceding the adaptive signal processor. However, conventional beam forming methods have been unable to avoid the issue of a significant deterioration in accuracy of a reconstructed image caused by thinning the number of input channels.

In contrast, with the beamspace method according to the present invention, a reconstruction process is performed by exclusively extracting spatial low-frequency components. Therefore, even if the number of input channels is thinned within certain limits, the influence of that thinning on reconstruction can be suppressed. As a result, compared to conventional methods, the present invention is capable of significantly reducing the amount of calculation without causing deterioration of the accuracy of a reconstructed image.

Since a calculation of a DFT coefficient must be executed for each clock at which an ultrasound reception signal is inputted and involves a significantly large number of processes per unit time, such a reduction in the scale of calculation is extremely effective toward downsizing and cost reduction of an apparatus.

Moreover, besides the DFT method, orthogonal transforms such as DCT (Discrete Cosine Transform) and KL Expansion (Karhunen Loeve Expansion) or a linear combination of such orthogonal transforms may be used for calculating low-frequency components. In addition, a similar effect may be produced by a general linear calculation (weighted summation) capable of extracting spatial low-frequency components.

First Embodiment

Figure 1:
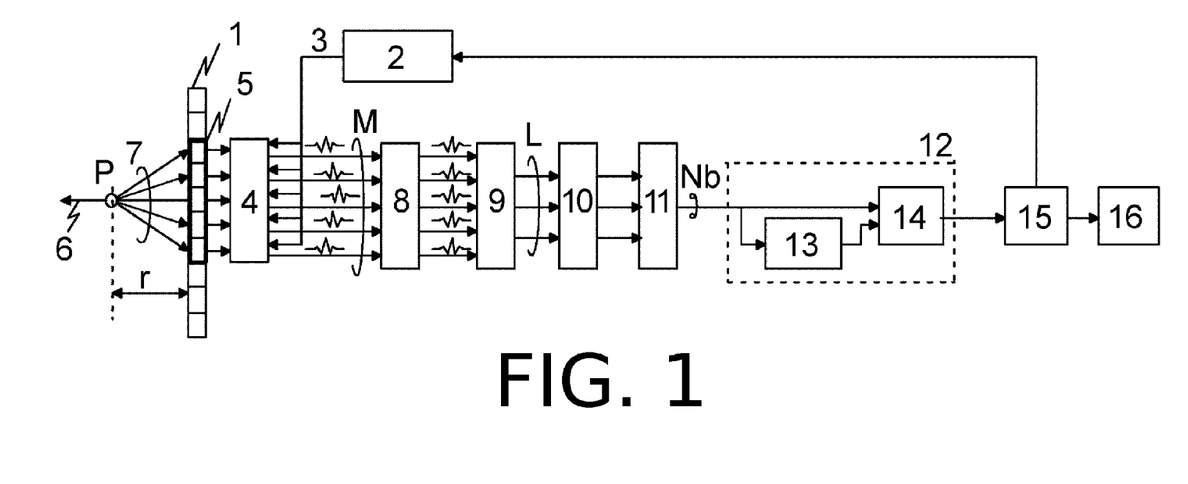
FIG. 1 is a diagram showing a configuration of an apparatus according to a first embodiment.

FIG. 1 shows a configuration example of an ultrasound imaging apparatus that is an object information acquiring apparatus according to the present invention. In FIG. 1, a transmission signal processing circuit 2 generates a transmission signal 3 according to an instruction of a CPU 15, drives an ultrasound transmitting/receiving element group 5 of an ultrasound probe 1 via a transmission/reception control circuit 4, and transmits a pulsed ultrasound beam 6.

An ultrasound echo wave 7 generated by reflection of the ultrasound beam 6 is once again converted into electrical signals of M number of channels (where M is a positive integer) by the ultrasound transmitting/receiving element group 5 and is sent to a delaying circuit 8 via the transmission/reception control circuit 4. The sent electrical signals are converted into digital signals by an AD conversion circuit (not shown). The delaying circuit 8 adjusts a delay time of each signal so that arrival time instants of echo signals from an arbitrary point P on the ultrasound beam 6 become consistent with each other. Accordingly, reception signals originating from a same target position are aligned at a same time instant and phases thereof become consistent with each other.

A signal eliminating circuit 9 spatially smoothes and thins the signals of the M number of channels with the aligned arrival times in order to convert the signals of the M channels into signals of a smaller number L of channels (L is a positive integer and M>L). The delaying circuit corresponds to a delaying unit according to the present invention and the signal eliminating circuit corresponds to an eliminator according to the present invention.

A complex transformation circuit 10 is a circuit that respectively converts signals of the thinned L number of channels into complex signals. A complex transformation process by the complex transformation circuit 10 involves converting an input signal constituted by a series of real values into a complex signal by generating a signal with each frequency component 90-degrees out of phase and adding the 90-degrees out-of-phase signal as an imaginary part. Since a signal that is 90-degrees out of phase can be calculated using an FIR filter with odd number of taps and antisymmetric coefficients, the complex transformation circuit 10 can be readily realized.

A DCT coefficient calculating circuit 11 performs a DCT transform in a spatial direction (a channel direction) on the complex signals of the L of channels for each clock of the input signals and outputs Nb number of DCT coefficients from a low frequency side. In the present embodiment, DCT is used as means of linear conversion (weighted summation). Accordingly, the ultrasound reception signals of M channels inputted from the ultrasound transmitting/receiving element group 5 are converted into complex signals of Nb channels.

The complex transformation circuit and the DCT coefficient calculating circuit correspond to a calculator according to the present invention.

An adaptive signal processing circuit 12 is constituted by a weight vector calculating circuit 13 and a power calculating circuit 14, calculates an optimal weight vector based on the DCMP method from the signals of Nb number of channels, calculates a constrained minimum power from the weight vector and the input signals of Nb number of channels, and sends the constrained minimum power to the CPU 15.

Accordingly, the CPU 15 is capable of obtaining a highly accurate echo strength signal on a transmission beam path. The CPU 15 sequentially scans a source position and a direction of ultrasound beams using the transmission signal processing circuit 2 to collect an echo image signal on each ultrasound beam path, creates an echo image based on the echo image signals, and displays the echo image on a display apparatus 16. The adaptive signal processing circuit corresponds to a signal processor according to the present invention.

According to the configuration of the first embodiment, since the number of channels is reduced from M to L by the signal eliminating circuit 9, the scale of the subsequent complex transformation circuit 10 and DCT coefficient calculating circuit 11 is reduced, for each of these two circuits, to approximately L/M of the respective original scale thereof. For example, if M=128 and L=32, then the scales of the complex transformation circuit 10 and the DCT coefficient calculating circuit 11 are respectively reduced to approximately ¼ of their original scale.

As shown, according to the present invention, since circuit sizes of not only the portion of the adaptive signal processing circuit which has the largest circuit size but also the complex signal processing circuit and the DCT coefficient calculating circuit in preceding stages are significantly reduced, a high-performance ultrasound imaging apparatus can be provided as a small and inexpensive apparatus. Moreover, in addition to a basic configuration of an ultrasound apparatus using adaptive signal processing such as that shown in the first embodiment, a practical apparatus can adopt a configuration that includes a spatial averaging process. In this case, an effect of reducing circuit volume is further enhanced as will be described in the second embodiment.

Figure 2:
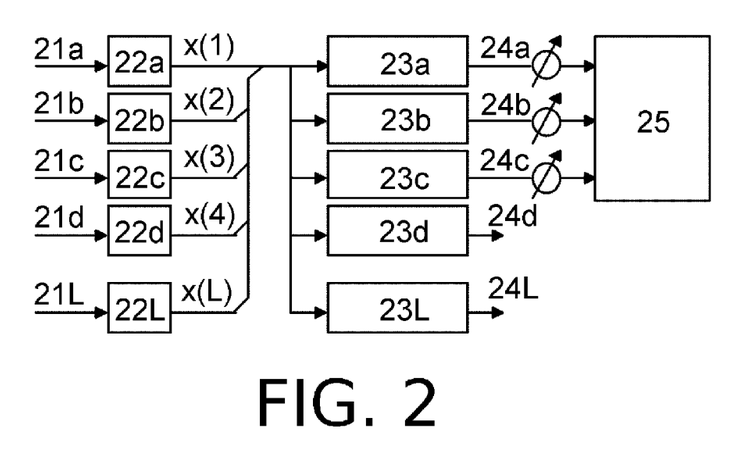
FIG. 2 is an explanatory diagram of a beamspace method.
Figure 3A:
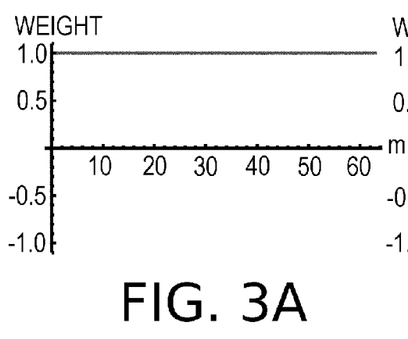
FIGS. 3A to 3D show examples of a weight waveform of a DCT coefficient calculation.
Figure 3B:
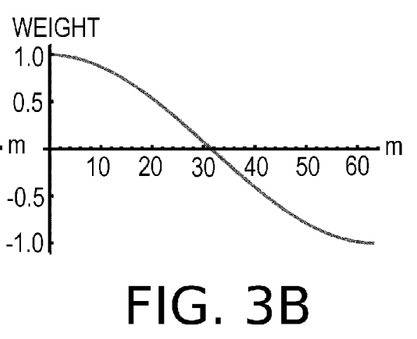
Figure 3C:
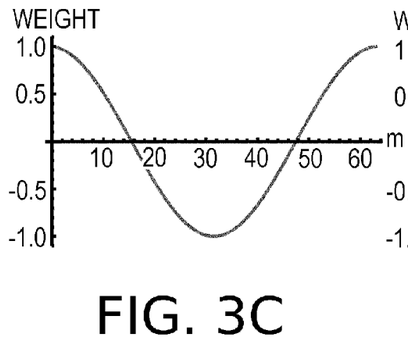
Figure 3D:
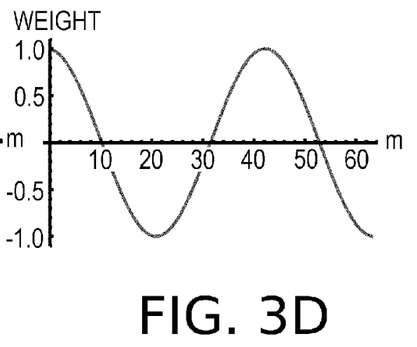
Figure 4A:
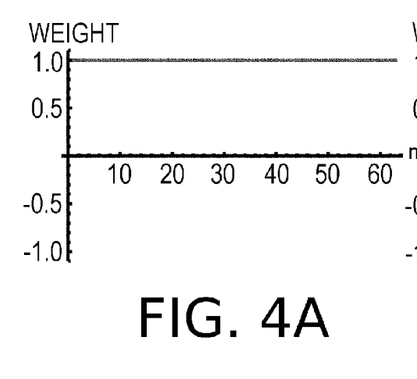
FIGS. 4A to 4D show examples of a weight waveform of a DFT coefficient calculation.
Figure 4B:
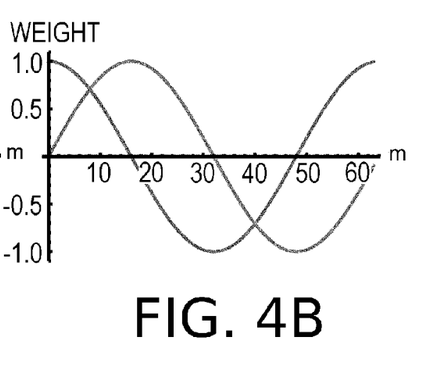
Figure 4C:
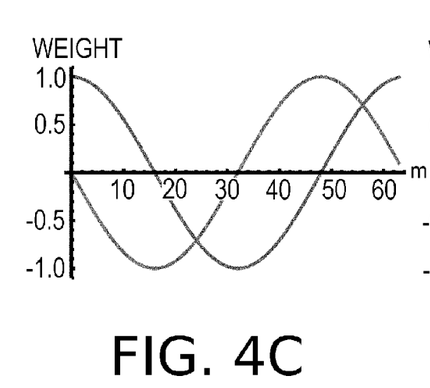
Figure 4D:
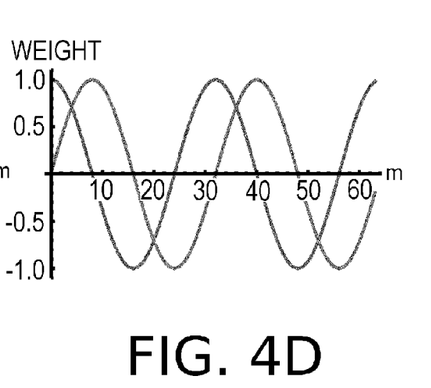

Next, a reason for the ability of the present invention to be downsized without jeopardizing performance as an apparatus will be explained. FIG. 2 is a principle diagram of a beamspace method in an ultrasound apparatus. With the beamspace method, as shown, input signals 21a, 21b, ..., 21L of L number of channels are delayed by delaying units 22a, 22b, ..., 22L. The delayed input signals x(1), x(2), ..., x(L) are converted into a plurality of beam signals 24a, 24b, 24c, ... by weighted summation units 23a, 23b, ..., 23L. Subsequently, a beam forming process is once again performed using the beam signals 24a, 24b, 24c, ... as input signals of a beam forming unit 25.

The beamspace method using orthogonal transform according to the present invention is a method in which an orthogonal transform process such as DFT represented by Expression (6) and DCT represented by Expression (7) is performed as the initial weighted summation units 23a, 23b, 23c, ..., 23L. In Expressions (6) and (7), since the input signals x(1), x(2), ..., x(L) are signals which vary over time, outputted coefficient values thereof are also signals which vary over time. Each outputted coefficient corresponds to the beam signals 24a, 24b, 24c, ... shown in FIG. 2.

[Math. 4]

$$a_k = \sum_{m=0}^{L-1} e^{j \cdot 2\pi k m/L} \cdot x(m) \quad (6)$$

$$a_k = \sum_{m=0}^{L-1} \cos\left[\frac{\pi}{L} \cdot k \cdot \left(m + \frac{1}{2}\right)\right] \cdot x(m) \quad (7)$$

Normally, a signal component of an ultrasound reception wave in an ultrasound imaging apparatus is a reflected signal from a vicinity of a position of a beam focused by an ultrasound transmitter. Therefore, phases of a reception signal after delaying that is focused on a reflected ultrasound signal from a focused beam position are approximately aligned among the channels and spatially constitute a direct-current component or a low-frequency component closely resembling a direct-current component.

Therefore, by performing an orthogonal transform such as DFT or DCT as means for weighted summation, signal components of a received wave are concentrated on low-frequency coefficients and, as a result, a beam forming process in a subsequent stage may be sufficiently performed using only the low-frequency components 24a, 24b, and 24c. In this case, since interfering wave components that arrive from outside a focus point are strongly reflected on high-frequency components 24d, ..., 24z, such interfering wave components are desirably omitted. In other words, since the number of input signal channels can be significantly reduced by the beamspace method using orthogonal transform, a size of an adaptive signal processing circuit can be significantly reduced without considerably jeopardizing beam forming quality.

Next, the fact that circuit size can also be reduced by the signal eliminating circuit 9 without jeopardizing beam forming quality will be described. FIG. 3 specifically depicts weight values when calculating DCT represented by Expression (7) as waveforms. FIGS. 3A, 3B, 3C, and 3D respectively depict weight waveforms when sequentially calculating a 0th-order component, a 1st-order component, a 2nd-order component, and a 3rd-order component from a low-frequency coefficient, wherein abscissas correspond to channel numbers of input signals. In other words, an input signal of each channel is multiplied by a corresponding weight in the drawings at each point in time, and results of the multiplications are totaled.

FIG. 4 similarly sequentially shows weight values when calculating DFT represented by Expression (6) in an ascending order of frequency. FIGS. 4A, 4B, 4C, and 4D respectively correspond to weight waveforms when k=0, 1, −1, and 2. In addition, since a DFT weight is a complex number, respective real parts and imaginary parts are represented by two lines.

FIGS. 3 and 4 show that all weight waveforms have sinusoidal wave shapes. Although wave numbers differ depending on coefficients, when Nb number of coefficients are selected from low frequencies, a wave number thereof is equal to or less than (Nb−1)/2 at the most.

While a DCT coefficient is calculated by multiplying a signal of each channel by a corresponding weight and totaling the products, a weight waveform of the DCT coefficient is a low-frequency sinusoidal wave that varies gradually as shown in FIGS. 3 and 4. Therefore, a result of weighted summation does not considerably differ when nearby signals are summed in advance and consolidated into a single signal and then subjected to weighted summation. In other words, a result of coefficient calculation does not considerably differ when signals of M number of channels are thinned to L number of signals by summing in groups of (M/L) number of signals.

A result of coefficient calculation becomes a further favorable approximation by performing thinning after appropriately smoothing signals between channels instead of performing a simple summation. If a weight waveform is not exclusively constituted by low-frequency components as shown in FIGS. 3 and 4 but also includes a large number of high-frequency components, it is difficult to perform a highly-accurate approximate calculation by such thinning. Normally, a quality of a reconstructed image deteriorates dramatically when beam forming is performed by thinning input signals. However, in the present invention, since only spatial low-frequency components are used by orthogonal transform, a certain amount of thinning does not considerably jeopardize the quality of a reconstructed image.

Although the greater the degree of thinning, the greater the reduction in circuit size, when thinning equals or exceeds a certain degree, the quality of the reconstructed image deteriorates dramatically. In consideration of the fact that a weight waveform during an orthogonal transform calculation is a sinusoidal wave, at least four weighted summations are required in one wavelength of the sinusoidal wave to obtain a meaningful result of the coefficient calculation. In this case, since a maximum wave number for Nb number of output coefficients is (Nb−1)/2 as described earlier, the thinned number L must satisfy Expression (8):

$$M > L >= 2(Nb-1) \quad (8)$$

In other words, to make the present invention useful, the number of signals L is desirably a maximum value which is permissible by the circuit size but which still fits within this range. In addition, while the number Nb of output coefficients is to be determined by experiment, since a known evaluation result indicates that a major effect can be produced when Nb is equal to or greater than three, the number Nb favorably ranges from approximately three to five.

Moreover, while the description given above is premised on performing an orthogonal transform such as DCT and DFT, the present invention can also be applied to a non-orthogonal transform represented by a general linear transform due to exactly the same reasons as long as the non-orthogonal transform is capable of extracting spatial low-frequency components. Such an application is also included in the present invention.

Figure 5:
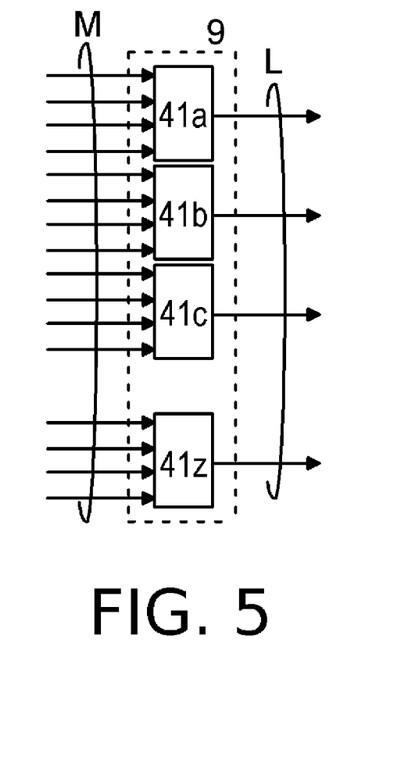
FIG. 5 shows a first configuration example of a signal eliminating circuit.

FIG. 5 shows a detailed example of the signal eliminating circuit 9. Input signals of M number of channels are summed in groups of four channels by summation circuits 41a, 41b, 41c, . . . and are transferred to a subsequent stage as signals of L=M/4 number of channels.

Figure 6A:
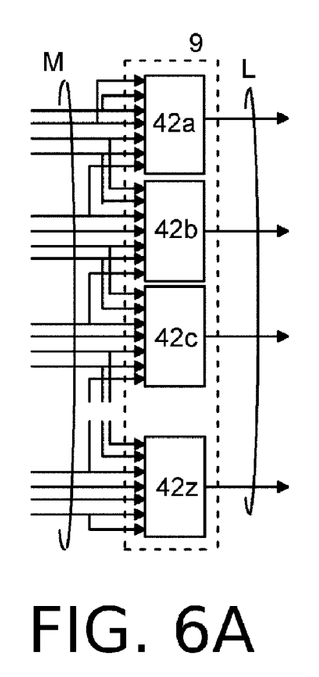
FIGS. 6A and 6B show a second configuration example of a signal eliminating circuit.
Figure 6B:
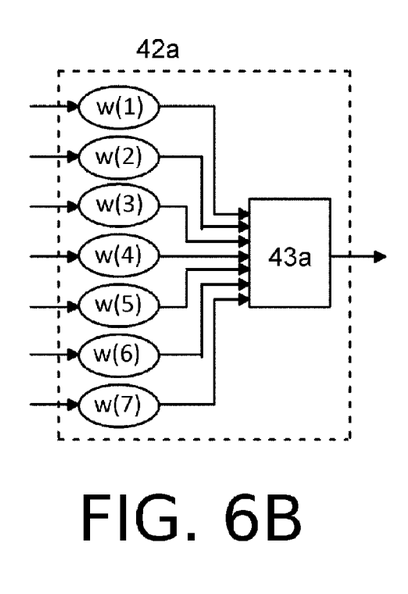

FIGS. 6A and 6B show a further modified example of the signal eliminating circuit. Input signals of M number of channels are inputted to weighted summation circuits 42a, 42b, 42c, . . . in overlapping groups of seven channels as shown in FIG. 6A. In this case, the predetermined number of input signals that are selected as simultaneously processed targets is set to seven. The inputted signals of seven channels are respectively multiplied by weights w[1], w[2], w[3], . . . as shown in FIG. 6B and totaled and outputted by a totaling circuit 43a. While weighted summations are performed in groups of seven channels, since inputs are overlapped, a total number of outputted channels is L=M/4 channels which is the same as the example shown in FIG. 5.

For example, the seven weights w[1], w[2], w[3], . . . may be set at proportions of {1, 2, 3, 4, 3, 2, 1}. Generally, compared to simply performing averaging (smoothing of equal weights), a more favorable degree of approximation of a coefficient value after an orthogonal transform can be obtained by performing thinning including a smoothing process in which weighting is performed according to position.

As described above, according to the present invention, the number of channels of input data can be thinned without jeopardizing the quality of adaptive signal processing. Accordingly, since a preceding-stage DCT circuit and the like can be downsized in addition to a subsequent-stage adaptive signal processing circuit, a highly-accurate ultrasound imaging apparatus can be provided as a small and inexpensive practical apparatus.

Second Embodiment

Figure 7:
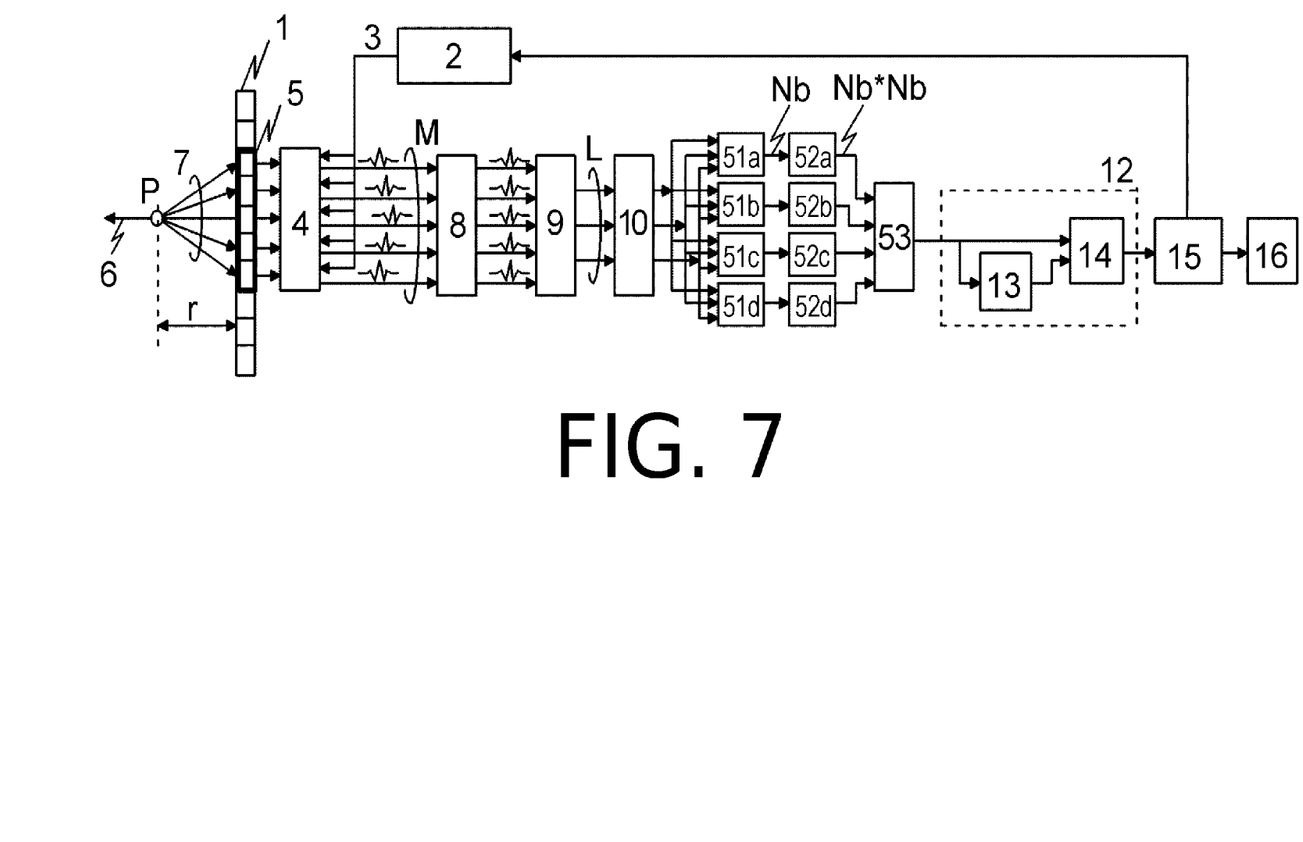
FIG. 7 is a diagram showing a configuration of an apparatus according to a second embodiment.

An embodiment that incorporates a spatial averaging method will now be described with reference to FIG. 7. While the first embodiment described above is a basic configuration of an ultrasound imaging apparatus based on adaptive signal processing using a beamspace method, the ultrasound imaging apparatus is susceptible to correlative interference waves and problems may arise with respect to accuracy of a reconstructed image. A spatial averaging method is commonly known as an effective countermeasure to correlative interference waves. In FIG. 7, the spatial averaging method is added to the first embodiment.

As shown, the spatial averaging method involves first calculating a plurality of complex correlation matrices using a plurality of DCT coefficient calculating circuits 51a, 51b, 51c, . . . and a plurality of complex correlation matrix calculating circuits 52a, 52b, 52c, . . . based on input signals from a complex transformation circuit 10. Next, the calculated plurality of complex correlation matrices are totaled by a summation circuit 53, and the result thereof is to be inputted to a subsequent-stage adaptive signal processing circuit 12. Other components are basically the same as those of the first embodiment.

Figure 8:
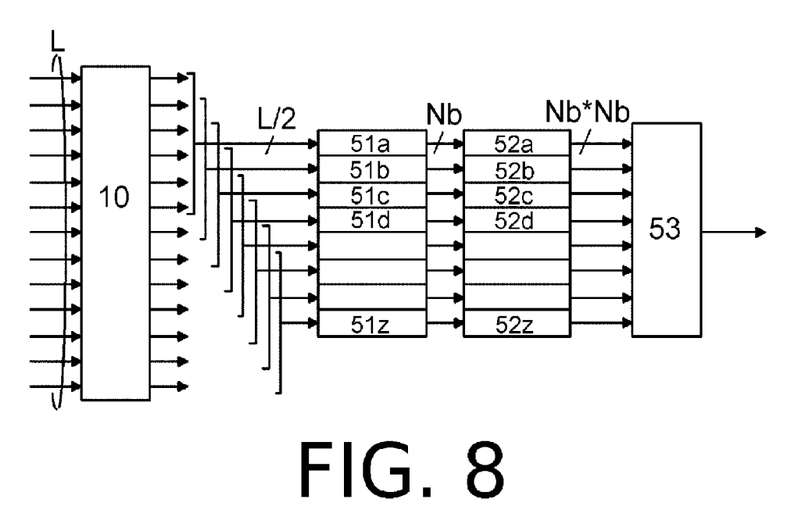
FIG. 8 shows a detailed embodiment of a spatial averaging process.

FIG. 8 is a diagram which illustrates, in greater detail, an example of flow of a signal in the spatial averaging method. In the present embodiment, complex correlation matrices are calculated by selecting groups of signals of L/2 number of channels from output signals of L channels of the complex transformation circuit 10 by shifting one channel at a time to select a total of (L/2+1) number of signal groups, and independently performing an orthogonal transform of the L/2 number of channels. Next, the calculated complex correlation matrices are totaled by a summation circuit 23 to be used as an output signal to a subsequent stage. As shown, by averaging complex correlation matrices of spatially displaced input signals, the spatial averaging method advantageously enables image reconstruction in which an effect of correlative interference waves has been reduced.

However, performing spatial averaging causes a dramatic increase in the numbers of DCT transform circuits and complex correlation matrix calculation circuits and, as a result, increases circuit volume. Therefore, the effect produced by the preceding-stage signal eliminating circuit according to the present invention becomes more prominent. In the case of the spatial averaging method, since the number of product sum computations necessary for DCT transform that has a large calculation volume is approximately proportional to the square of the number of input signal channels, when signals are reduced to L=M/4, circuit size is reduced to $1/16$. In other words, implementing the preceding-stage signal eliminating circuit produces a significant advantage.

Third Embodiment

Figure 9:
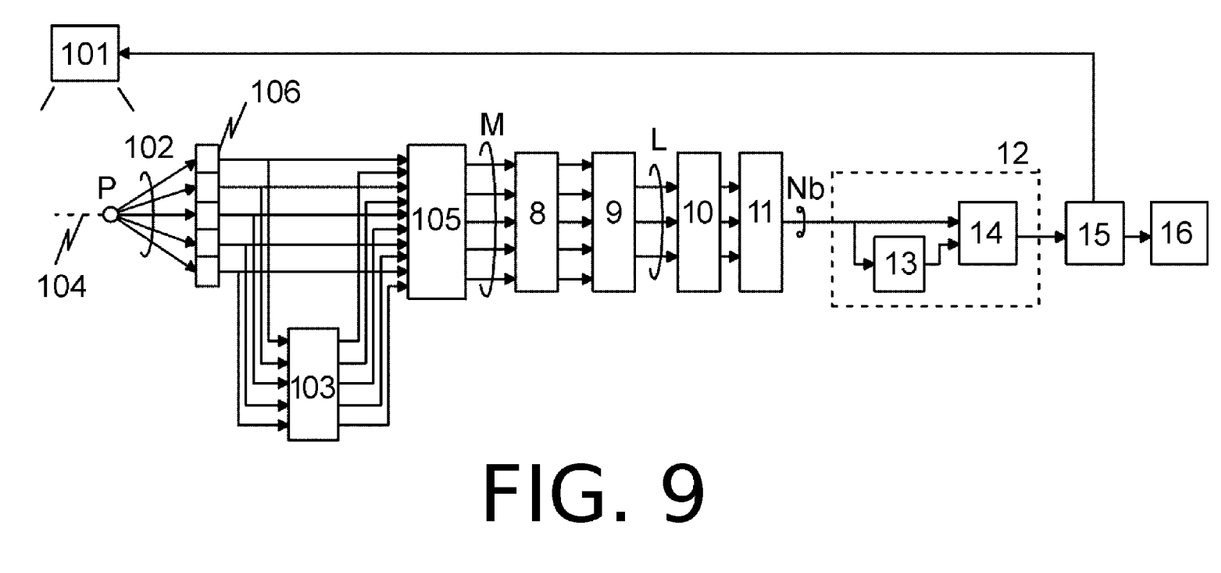
FIG. 9 is a diagram showing a configuration of an apparatus according to a third embodiment.

An embodiment of a photoacoustic imaging apparatus which processes photoacoustic signals will now be described with reference to FIG. 9. In FIG. 9, a light source 101 irradiates the inside of an object with electromagnetic waves according to an instruction of a CPU 15. Test object substances that exist inside the object respectively absorb the irradiated electromagnetic waves and simultaneously generate photoacoustic waves due to thermal expansion. An ultrasound receiving element group 106 converts an arrived acoustic wave into an electrical signal and transmits the electrical signal to a delaying circuit 8 via a selection circuit 105.

At this point, by defining an arbitrary scanning line 104 inside the object and focusing only on photoacoustic waves generated on the scanning line 104, a generation position P of a photoacoustic wave 102 received by the ultrasound receiving element group 106 moves from a nearby position to a distant position on the scanning line 104 over time. In this case, by appropriately varying a delay time of the delaying circuit 8 in accordance with a time instant of reception, the delaying circuit 8 is capable of outputting photoacoustic signals generated at all points on the single scanning line 104 as signals with aligned phases.

Since these signals are exactly the same as signals produced by delaying echo signals obtained by transmitting an ultrasound beam in a direction of the scanning line 104, a photoacoustic signal strength waveform can be calculated by a circuit configuration shown in FIG. 9 that is exactly the same as that of the first embodiment which receives echo signals. Therefore, a photoacoustic image of an entire inside surface of the object can be created by repetitively performing electromagnetic wave irradiation and photoacoustic wave reception while moving positions on a scanning line.

Alternatively, a configuration may be adopted in which a storage circuit 103 that stores reception signals is provided as shown in FIG. 9, wherein a reception signal due to an initial electromagnetic wave irradiation is stored in the storage circuit 103 and signals read out from the storage circuit 103 are used as second and subsequent reception signals. A reception signal due to electromagnetic wave irradiation remains the same unless positions of the light source 101 and the ultrasound receiving element group 106 are varied. Therefore, by repetitively performing a process of storing a reception signal in the storage circuit 103 due to a single electromagnetic wave irradiation and calculating a reconstructed image on a single scanning line 104 by reading a signal from the storage circuit 103 while varying scanning line positions, the number of electromagnetic wave irradiations can be reduced and an highly efficient apparatus can be realized.

As shown, the present invention is similarly applicable to a photoacoustic imaging apparatus which receives a photoacoustic wave that is generated by electromagnetic wave irradiation to reconstruct a light-induced ultrasound image, and is capable of providing a small high-performance apparatus.

As described above, with the object information acquiring apparatus according to the present invention, a technique for downsizing a scale of an ultrasound imaging apparatus using the DCMP method can be provided.

For example, let us assume that M number of input signal channels=128, Nb (the number of signals after linear transform)=3, and Lb (the number of channels after reduction)=16. While a DFT coefficient calculation normally requires M*Nb=384 product sums, the present invention only requires L*Nb=48 product sums, which is a reduction in the scale of calculation to ⅛. In addition, while a practical apparatus that further requires spatial averaging needs (M/2)*Nb*(M/2)=12,228 calculations, the present invention only needs (L/2)*Nb*(L/2)=192 calculations, which is a reduction in the scale of calculation to 1/64.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-274224, filed on Dec. 15, 2011, which is hereby incorporated by reference herein in its entirety.

The invention claimed is:

1. An apparatus comprising:
a plurality of receiving elements configured to receive an acoustic wave propagating from an object and convert the acoustic wave into an electrical signal;
a delaying unit configured to align phases of electrical signals of a number M channels outputted from said plurality of receiving elements;
an eliminator configured to reduce electrical signals, where the phases are aligned by said delaying unit, of said M channels to electrical signals of a number L channels;
a calculator configured to calculate a number Nb output signals corresponding to low-frequency components of a complex signal based on the electrical signals of L channels outputted from said eliminator; and
a signal processor configured to perform beam formation according to adaptive signal processing using the Nb output signals outputted from said calculator,
wherein M, L and Nb which are positive integers satisfy the relation M>L>=2(Nb−1), and wherein Nb is equal to or greater than 3.

2. The apparatus according to claim 1, wherein said eliminator averages the electrical signals, where the phases are aligned by said delaying unit, of the M channels in groups of (M/L) number of electrical signals.

3. The apparatus according to claim 1, wherein said eliminator selects the electrical signals, where the phases are aligned by said delaying unit, of the M channels in groups of a predetermined number of electrical signals, and performs a weighted smoothing process according to positions of channels.

4. The apparatus according to claim 1, wherein said signal processor calculates a constrained minimum power using a Directionally Constrained Minimization of Power (DCMP) method.

5. The apparatus according to claim 4, wherein said signal processor performs a calculation by the Directionally Constrained Minimization of Power method using a number Nb of the output signals and weight vectors calculated from a number Nb of the output signals.

6. The apparatus according to claim 1, wherein said calculator calculates the Nb output signals by performing processing by a spatial averaging method on the electrical signals of the L channels outputted from said eliminator.

7. The apparatus according to claim 1, wherein an acoustic wave propagating from an object is a reflection of acoustic waves transmitted from said plurality of receiving elements.

8. The apparatus according to claim 1, wherein an acoustic wave propagating from an object is an acoustic wave generated from an object irradiated with an electromagnetic wave.

9. The apparatus according to claim 1, wherein Nb is 3, 4 or 5.

10. A method for performing beam formation according to adaptive signal processing based on electrical signals of a number M of channels obtained by converting an acoustic wave propagating from an object with a plurality of receiving elements, comprising:
- a step of aligning phases of the electrical signals of a number M of channels;
- a step of reducing electrical signals, where the phases are aligned, of the M channels to electrical signals of a number L of channels;
- a step of calculating a number Nb of output signals corresponding to low-frequency components of a complex signal based on the electrical signals of the L channels; and
- a step of performing beam formation according to adaptive signal processing using a number Nb of output signals,
- wherein M, L and Nb which are positive integers satisfy the relation M>L>=2(Nb−1), and wherein Nb is equal to or greater than 3.

11. A method for performing beam formation according to adaptive signal processing based on electrical signals of a number M of channels obtained by converting an acoustic wave propagating from an object with a plurality of receiving elements, comprising:
- a step of obtaining electrical signals of a number L of channels, where phases are aligned, based on the electrical signals of the M channels;
- a step of calculating a number Nb of output signals corresponding to low-frequency components of a complex signal based on the electrical signals of the L channels; and
- a step of performing beam formation according to adaptive signal processing using the Nb output signals outputted from the calculating step,
- wherein M, L, and Nb which are positive integers satisfy the relation M>L>=2(Nb−1), and wherein Nb is equal to or greater than 3.

12. The method according to claim 10, wherein Nb is 3, 4 or 5.

13. The method according to claim 11, wherein Nb is 3, 4 or 5.

* * * * *